(12) United States Patent
Park et al.

(10) Patent No.: US 9,356,349 B2
(45) Date of Patent: May 31, 2016

(54) MICRO ANTENNA FEEDER FOR WIDE BAND, WITH A QUAD SCHEME ANTENNA ORTHOGONALLY INSTALLED TO A CROSS DIPOLE ANTENNA

(75) Inventors: Chan Goo Park, Daejeon (KR); Jun Hee Lee, Cheongwon-gun (KR)

(73) Assignee: WIWORLD CO., LTD (KR)

( * ) Notice: Subject to any disclaimer, the term of this patent is extended or adjusted under 35 U.S.C. 154(b) by 242 days.

(21) Appl. No.: 13/879,265

(22) PCT Filed: Nov. 22, 2010

(86) PCT No.: PCT/KR2010/008223
§ 371 (c)(1),
(2), (4) Date: Apr. 12, 2013

(87) PCT Pub. No.: WO2012/057393
PCT Pub. Date: May 3, 2012

(65) Prior Publication Data
US 2013/0210372 A1    Aug. 15, 2013

(30) Foreign Application Priority Data
Oct. 28, 2010  (KR) .................. 10-2010-0105807

(51) Int. Cl.
| H01Q 5/00 | (2015.01) |
| H01Q 21/26 | (2006.01) |
| H01Q 21/30 | (2006.01) |
| H04B 1/40 | (2015.01) |
| H01Q 5/50 | (2015.01) |

(52) U.S. Cl.
CPC ............... *H01Q 5/0093* (2013.01); *H01Q 5/50* (2015.01); *H01Q 21/26* (2013.01); *H01Q 21/30* (2013.01); *H04B 1/40* (2013.01)

(58) Field of Classification Search
None
See application file for complete search history.

(56) References Cited

U.S. PATENT DOCUMENTS

| 5,838,282 | A | * | 11/1998 | Lalezari et al. ............... 343/727 |
| 6,229,498 | B1 | * | 5/2001 | Matsuyoshi et al. ......... 343/895 |
| 6,329,954 | B1 | | 12/2001 | Fuchs et al. |
| 6,333,720 | B1 | | 12/2001 | Gottl et al. |
| 6,377,220 | B1 | * | 4/2002 | Cook et al. .................... 343/713 |
| 6,518,859 | B1 | * | 2/2003 | Spampinato ................. 333/174 |
| 2004/0201542 | A1 | * | 10/2004 | Gottl et al. .................... 343/912 |
| 2004/0203337 | A1 | * | 10/2004 | Ammar .............. H04B 7/18528 455/3.02 |

(Continued)

FOREIGN PATENT DOCUMENTS

| CN | 1577974 | 2/2005 |
| CN | 101682120 | 3/2010 |
| WO | 2009072781 | 6/2009 |

OTHER PUBLICATIONS

International Search Report—PCT/KR2010/008223 dated Jul. 28, 2011.

*Primary Examiner* — Alejandro Rivero
(74) *Attorney, Agent, or Firm* — Cantor Colburn LLP

(57) ABSTRACT

Provided is a micro wideband antenna feeder, and more particularly, to a micro wideband antenna feeder in which a quad scheme antenna and a cross dipole antenna are coupled to each other. The micro wideband antenna feeder includes: a quad scheme antenna; and a cross dipole antenna installed orthogonal to the quad scheme antenna and irradiating current distribution orthogonal to current distribution irradiated from the quad scheme antenna. Since phases 0, 90, 180, and 270 can be shifted by being designed as a feeding network PCB, a circularly polarized wave can be implemented.

5 Claims, 8 Drawing Sheets

(56) References Cited

U.S. PATENT DOCUMENTS

| | | |
|---|---|---|
| 2004/0263392 A1 | 12/2004 | Bisiules et al. |
| 2008/0111757 A1 | 5/2008 | Bisiules et al. |
| 2010/0177014 A1 | 7/2010 | Min et al. |
| 2011/0025569 A1* | 2/2011 | Payne .......................... 343/727 |

* cited by examiner

MICRO ANTENNA FEEDER FOR WIDE BAND, WITH A QUAD SCHEME ANTENNA ORTHOGONALLY INSTALLED TO A CROSS DIPOLE ANTENNA

TECHNICAL FIELD

The present invention relates to a micro antenna feeder for a wide band. More particularly, the present invention a micro antenna feeder for a wide band in which a quad type antenna and a cross dipole antenna are coupled to each other.

BACKGROUND ART

In general, an ADE satellite antenna for transmitting and receiving a satellite frequency band signal of a C-band transmits and receives a satellite signal by installing a feeder (referred to as a feeding horn) at the position of a focus on which radio waves is collected by being reflected on a parabola dish in a prime focus scheme or a cassegrain scheme by using a parabola dish having a diameter of 1.2 m or more.

Since the band of the C-band uses a relatively low frequency of 3.4 to 6.725 GHz, the sizes of the parabola dish and the feeder need to be increased for a high gain of an antenna used for communication.

Further, in order to apply the prime focus and cassegrain scheme antennas having a comparatively smaller size than the known antenna, the size of the feeder is increased. That is, since the size of the feeder is increased, when the parabola dish is small, the feeder covers the parabola dish.

Further, when bi-directional communication is performed using the feeder, a polarizer for forming polarized waves and an orthogonal mode converter separating polarized waves of transmission and reception bands need to be provided. Therefore, manufacturing and installing processes are complicated and cost much.

Further, at present, a small-sized linearly polarized antenna system using a code division multiple access (CDMA) communication scheme has been developed. However, miniaturization of a circularly polarized antenna system should meet wideband characteristics such as an axial ratio and a gain and interference between transmission and reception antennas should be minimized. Therefore, there are many limits in development.

DISCLOSURE

Technical Problem

It is an object of the present invention to provide a micro antenna feeder for a wide band including minimized transmitter TX and receiver RX mounted thereon at the same time and having a small size while implementing a circularly polarized wave.

Further, it is another object of the present invention to provide a micro antenna feeder for a wide band that meets wideband characteristics in which transmission and reception bands are available when being coupled with a parabola dish.

Technical Solution

A preferred embodiment of the present invention provides a micro wideband antenna feeder. The micro wideband antenna feeder includes: a quad scheme antenna; and a cross dipole antenna installed orthogonal to the quad scheme antenna and irradiating current distribution orthogonal to current distribution irradiated from the quad scheme antenna.

Further, the micro wideband antenna feeder may include: a transmission circuit substrate coupled to the quad scheme antenna or the cross dipole antenna; and a reception circuit substrate coupled to the quad scheme antenna or the cross dipole antenna.

In this case, both transmission and reception bands may meet wideband circularly polarized characteristics.

Herein, the quad scheme antenna or the cross dipole antenna may share the same transmission/reception focus and space as assembled parabola dish.

Further, the transmission circuit substrate may include a transmission circuit pattern substrate and a transmission circuit cover substrate and the reception circuit substrate includes a reception circuit pattern substrate and a reception circuit cover substrate.

In this case, the transmission circuit pattern substrate and the reception circuit pattern substrate may include: a signal inputting unit; a signal distributing and phase shifting unit distributing a signal generated from the signal inputting unit and shifting a phase; a second signal distributing unit distributing the signal distributed and phase-shifted from the signal distributing and phase shifting unit to a plurality of predetermined second angles; a first signal delaying unit delaying the distributed and phase-shifted signal in order to change any one of the plurality of first angles to a third predetermined angle; and a second signal delaying unit the distributed and phase-shifted signal in order to change any one of the plurality of second angles to a fourth predetermined angle.

In this case, pattern widths of the signal distributing and phase shifting unit, the first signal distributing unit, the second signal distributing unit, the first signal delaying unit, and the second signal delaying unit may be in the range of 0.2 to 0.4 mm.

In this case, a pattern length of connecting the first signal distributing unit or the second signal distributing unit and one of the quad scheme antennas may be different from a pattern length of connecting the first signal delaying unit or the second signal delaying unit and the other one of the quad scheme antennas by a length $\lambda/4$.

Meanwhile, another preferred embodiment of the present invention provides a micro wideband antenna feeder. The micro wideband antenna feeder includes: a quad scheme antenna; a cross dipole antenna installed orthogonal to the quad scheme antenna and irradiating current distribution orthogonal to current distribution irradiated from the quad scheme antenna; a transmission circuit substrate coupled to the quad scheme antenna or the cross dipole antenna; a reception circuit substrate coupled to the quad scheme antenna or the cross dipole antenna; and a fastening unit connecting the reception circuit substrate and the transmission circuit substrate.

Further, in the micro wideband antenna feeder, the transmission circuit substrate may include a transmission circuit pattern substrate and a transmission circuit cover substrate and the reception circuit substrate includes a reception circuit pattern substrate and a reception circuit cover substrate.

In this case, the fastening unit may be a semi-rigid cable which externally connects the transmission circuit pattern substrate and the reception circuit pattern substrate.

Meanwhile, the fastening unit may connect the transmission circuit pattern substrate and the reception circuit pattern substrate through a via hole therein.

Herein, the quad scheme antenna may be any one of a quadrifilar helix antenna, a quadruple inverted F antenna, and a quadrifilar spiral antenna.

Advantageous Effects

According to preferred embodiments of the present invention, since phases 0°, 90°, 180°, and 270° can be shifted by being designed as a feeding network PCB, a circularly polarized wave can be implemented.

Further, as another effect of the present invention, since a feeder has a simple structure and has a low gain, it is possible to minimize mutual interference.

Further, as yet another effect, when being coupled with a parabola dish, wideband characteristics in which 60% or more of a transmission/reception band is available in a C-band band of 3.4 to 6.725 are met.

MODE FOR INVENTION

Figure 1:
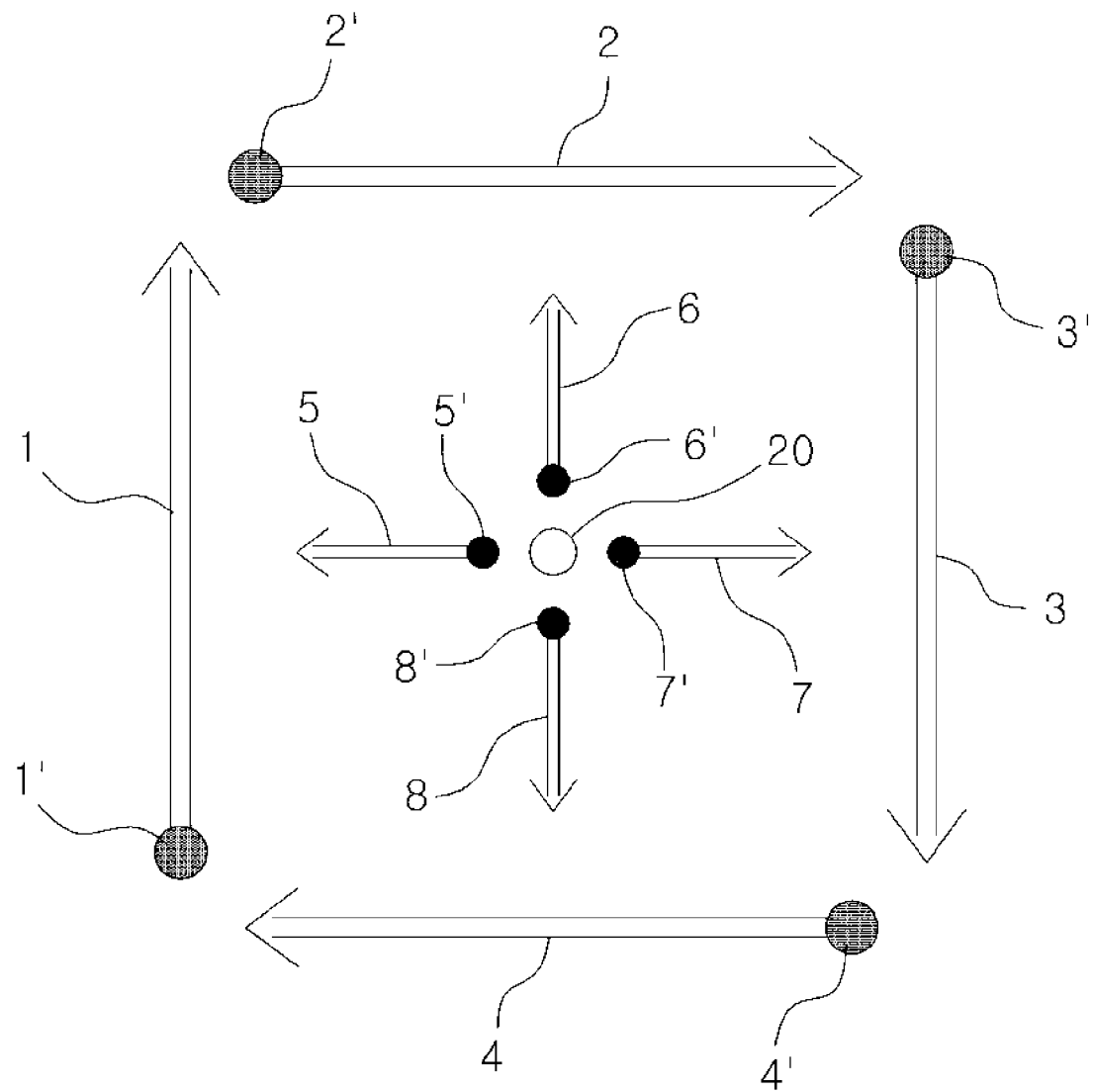
FIG. 1 is a current distribution diagram showing current distributions of a quad scheme antenna and a cross dipole antenna according to a preferred embodiment of the present invention.

Although the present invention can be modified variously and have several embodiments, the preferred embodiments are illustrated in the accompanying drawings and will be described in detail in the detailed description. However, the present invention is not limited to the specific embodiments and should be construed as including all the changes, equivalents, and substitutions included in the spirit and scope of the present invention. In the following description and drawings, like reference numerals refer to like elements.

Terms such as "first", "second", etc. can be used to describe various components, but the components are not limited to the terms. Terms described in the specification is used to discriminate one component from other components. For example, the first component may be called the second component without departing from the scope of the present invention.

Likewise, the second component may be called the first component. The term "and/or" includes a combination of a plurality of items or any one of a plurality of terms.

Stated that any components are "connected" or "coupled" to other components, it is to be understood that the components may be directly connected or coupled to other components, but another component may intervene therebetween. On the other hand, stated that any components are "directly connected" or "indirectly coupled" to other components, it is to be understood that there is no another component therebetween.

The terms used in the specification is used to describe only specific embodiments and is not intended to limit the present invention. The singular forms are intended to include the plural forms unless the context clearly indicates otherwise. It will be further understood that the terms "comprises" or "have" used in this specification, specify the presence of stated features, steps, operations, components, parts, or a combination thereof, but do not preclude the presence or addition of one or more other features, numerals, steps, operations, components, parts, or a combination thereof.

Unless indicated otherwise, it is to be understood that all the terms used in the specification including technical and scientific terms has the same meaning as those that are understood by those who skilled in the art.

It must be understood that the terms defined by the dictionary are identical with the meaning of the context of the related art, and they should not be ideally or excessively formally defined unless the context clearly dictate otherwise.

Hereinafter, a micro antenna feeder for a wide band according to a preferred embodiment of the present invention will be described in detail with reference to the accompanying drawings.

FIG. 1 is a current distribution diagram showing current distributions of a quad scheme antenna and a cross dipole antenna according to a preferred embodiment of the present invention. Referring to FIG. 1, the quad scheme antenna and the cross dipole antenna are structurally installed to be perpendicular to each other. Accordingly, a first quad scheme antenna and a first cross dipole antenna are orthogonal to each other, a second quad scheme antenna and a second cross dipole antenna are orthogonal to each other, a third quad scheme antenna and a first cross dipole antenna are orthogonal to each other, and a fourth quad scheme antenna and a second cross dipole antenna are orthogonal to each other.

In this case, quad scheme antenna feeding points 1' 2' 3' and 4' supplying power to the quad scheme antennas are configured such that current distributions 1, 2, 3, and 4 generated from the quad scheme antenna by the antenna feeding points 1' 2' 3' and 4' take a clockwise direction.

Further, cross dipole antenna feeding points 5' 6' 7' and 8' is configured even in the cross dipole antenna and current distributions 5, 6, 7, and 8 generated from the cross dipole antenna by the antenna feeding points 5' 6' 7' and 8' are irradiated to be orthogonal to the current distributions 1, 2, 3, and 4 of the quad scheme antenna from a transmission/reception focus.

Figure 3:
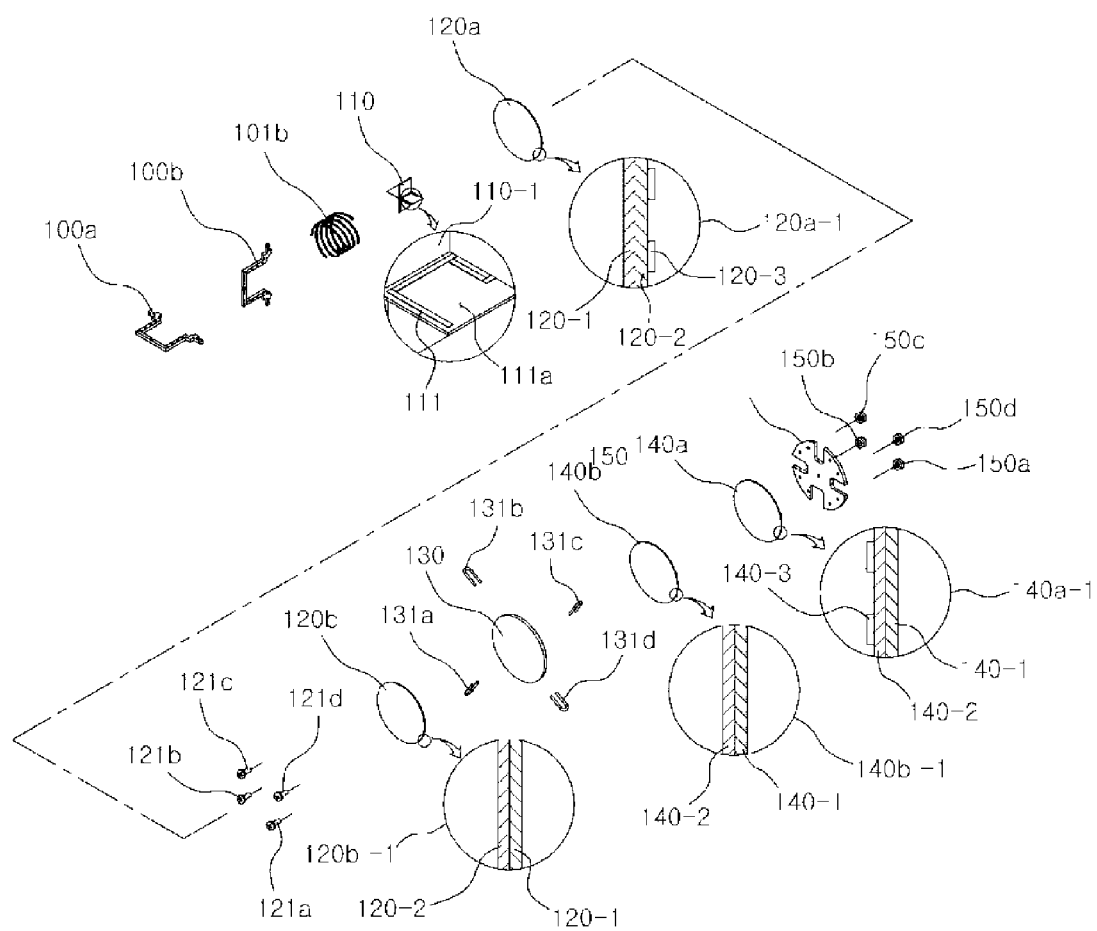
FIG. 3 is an exploded perspective view of a micro antenna feeder 10 for a wide band according to a preferred embodiment of the present invention.
Figure 4:
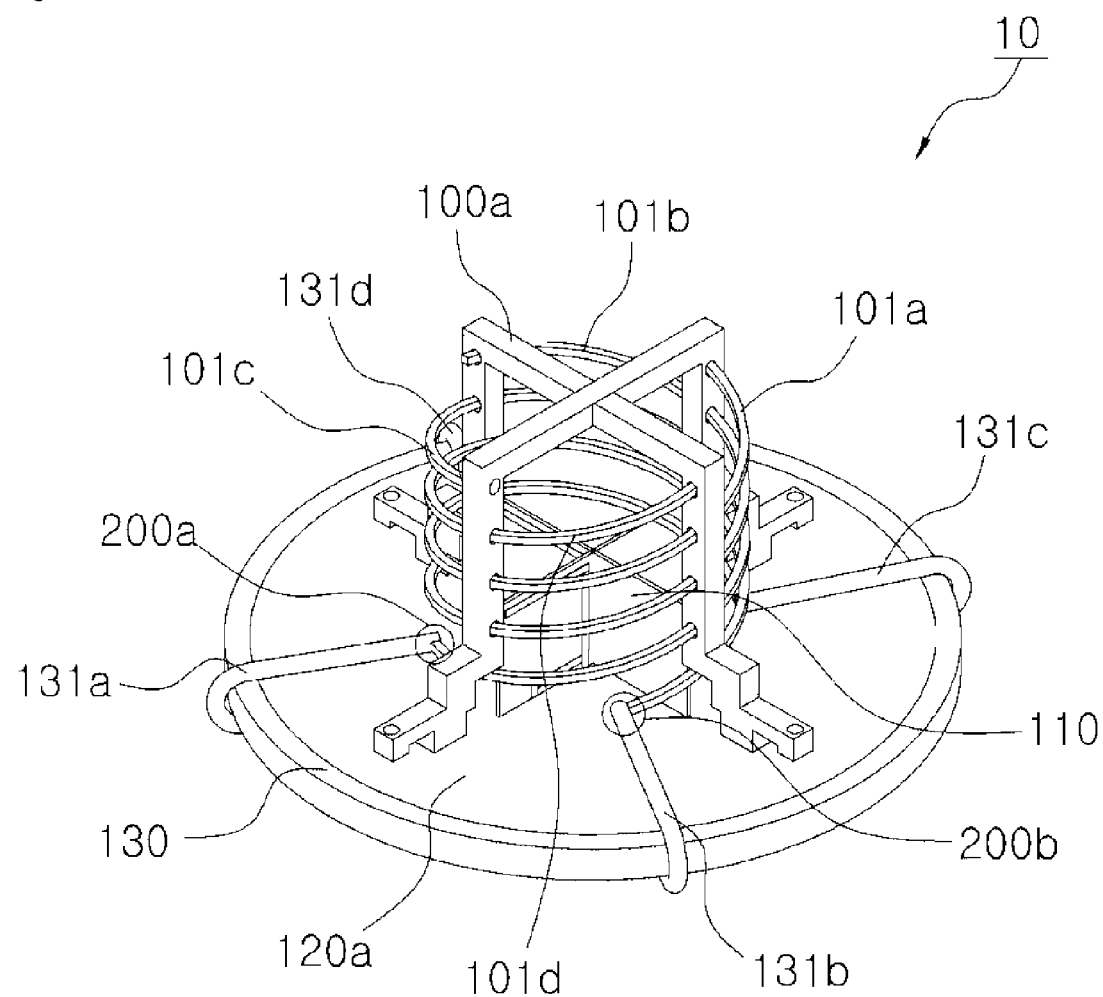
FIG. 4 is an external perspective view of a micro antenna feeder 10 for a wide band according to a preferred embodiment of the present invention.

For this, four quad scheme antennas and four cross dipole antennas are configured and four cross dipole antennas are laid in four quad scheme antennas. The pattern is shown in FIG. 3. That is, the quad scheme antennas 101a to 101d of FIG. 4 are laid outside and the cross dipole antenna 110 of FIG. 4 is laid in the quad scheme antennas 101a to 101d of FIG. 4. In this case, a frequency generated from the cross dipole antenna 110 of FIG. 4 configured inside is higher than frequencies generated from the quad scheme antennas 101a to 101d of FIG. 4 configured outside. FIG. 4 will be described below.

Therefore, as shown in FIG. 4, since the current distributions 1, 2, 3, and 4 of the quad scheme antenna and the current distributions 5. 6, 7, and 8 are orthogonal to each other, mutual influence between transmission and reception may be minimized., As a result, an isolation characteristic is enhanced.

Figure 2:
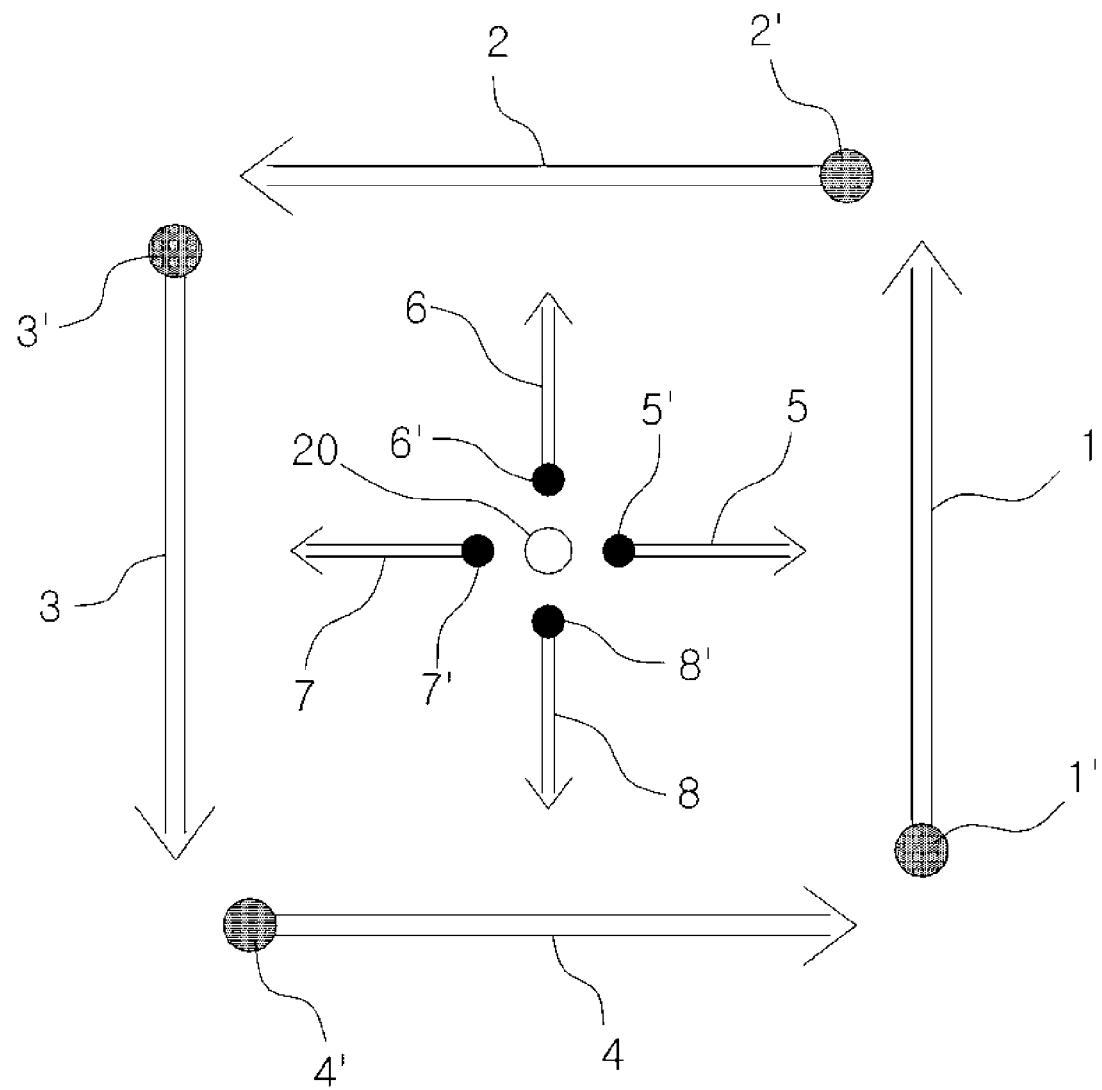
FIG. 2 is a current distribution diagram showing current distributions of a quad scheme antenna and a cross dipole antenna according to another preferred embodiment of the present invention.

FIG. 2 is a current distribution diagram showing current distributions of a quad scheme antenna and a cross dipole antenna according to another preferred embodiment of the present invention. Referring to FIG. 2, unlike FIG. 1, quad scheme antenna feeding points 1' 2' 3' and 4' supplying power to the quad scheme antennas are configured and current distributions 1, 2, 3, and 4 of the quad scheme antenna show a counterclockwise direction. Of course, in FIG. 2, the current distributions 1, 2, 3, and 4 of the quad scheme antenna and current distributions 5, 6, 7, and 8 of a cross dipole antenna are also orthogonal to each other in the same manner as FIG. 1.

FIG. 3 is an exploded perspective view of a micro antenna feeder 10 for a wide band according to a preferred embodiment of the present invention. In particular, FIG. 3 describes a case in which the quad scheme antenna described in FIG. 1 is a quadrifilar helix antenna.

Referring to FIG. 3, the micro antenna feeder 10 for a wide band includes spiral quadrifilar helix antennas 101a, 101b, 101c, and 101d, cross-shaped helix antenna supports 100a and 100b fixing the spiral quadrifilar helix antennas 101a, 101b, 101c, and 101d, a cross-shaped cross dipole antenna 110 inserted into the helix antenna supports 100a and 100b and having transmission circuit substrates 120a and 120b attached to the cross dipole antenna 110, a feeder bracket 130 having one surface contacting the reception circuit pattern substrates 140a and 140b and assembled with a parabola dish, and reception circuit substrates 140a and 140b contacting the other surface of the feeder bracket 130 and assembled with the spiral quadrifilar helix antennas 101a, 101b, 101c, and 101d.

The spiral quadrifilar helix antennas 101a, 101b, 101c, and 101d has a helix diameter of approximately 34 mm and a height of approximately 27 mm through 1.1 turn. The spiral quadrifilar helix antennas 101a, 101b, 101c, and 101d are installed at every 90° to be 360°. For this, the spiral quadrifilar helix antennas 101a, 101b, 101c, and 101d are constituted by four.

Figure 5:
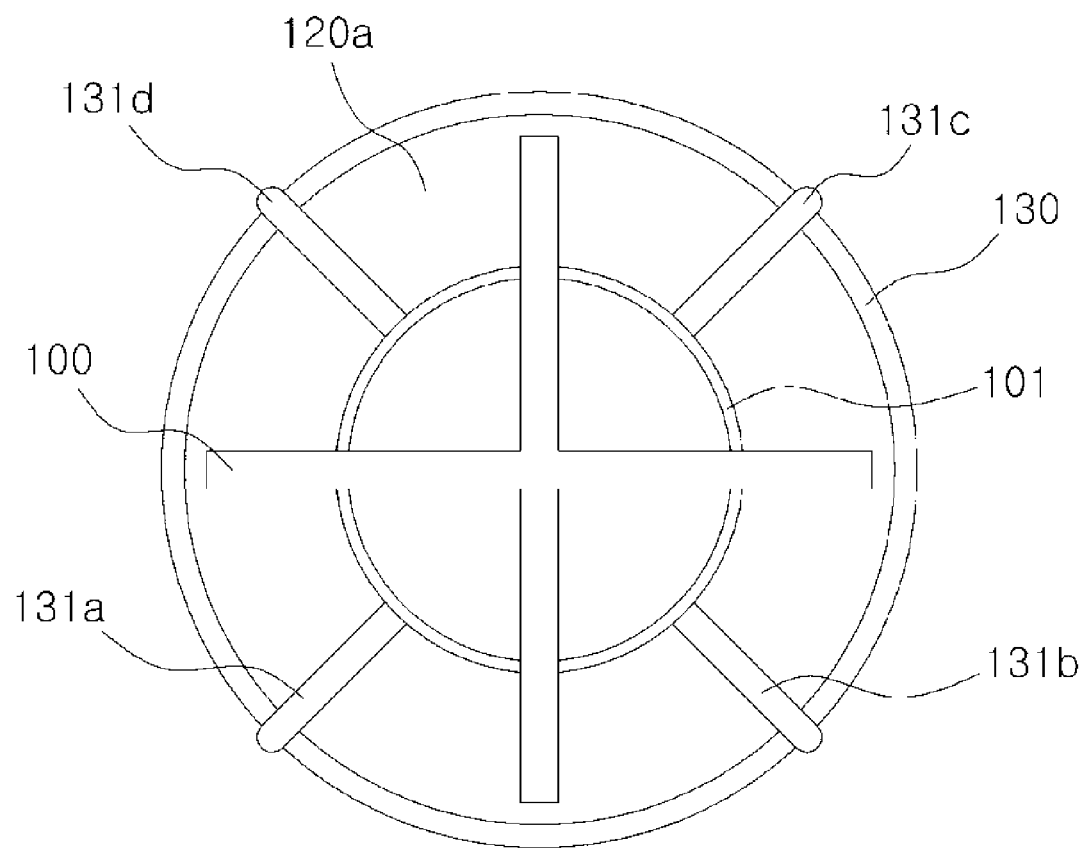
FIG. 5 is a plan view of a micro antenna feeder 10 for a wide band according to a preferred embodiment of the present invention.

Accordingly, the quadrifilar helix antennas 101a, 101b, 101c, and 101d are fixed to the helix antenna supports 100a and 100b and are shown like FIG. 5 when viewed in a plane. Further, FIG. 5 is a plan view of a micro antenna feeder 10 for a wide band according to a preferred embodiment of the present invention.

Referring back to FIG. 3, in the helix antenna supports 100a and 100b, a first helix antenna support 100a of a horizontal direction and a second helix antenna support 100b of a vertical direction are assembled to each other in a cross shape. Of course, holes (not shown) are generated on sides of the helix antenna supports 100a and 100b at regular intervals and the quadrifilar helix antennas 101a, 101b, 101c, and 101d are inserted into and fixed to the holes.

When the quadrifilar helix antennas 101a, 101b, 101c, and 101d are assembled, the cross dipole antenna 110 is inserted into and assembled to cylinders of the quadrifilar helix antennas 101a, 101b, 101c, and 101d. The cross dipole antenna 110 has the cross shape and the transmission circuit patterns are formed on four plates.

A cross dipole antenna enlarged diagram 110-1 showing it is shown. Referring to the enlarged diagram 110-1, one plate 111 among four plates is shown and a transmission circuit pattern 111a is formed on the plate 111. Of course, the transmission circuit pattern 11a is formed on all four plates constituting the cross dipole antenna 110.

Figure 6:
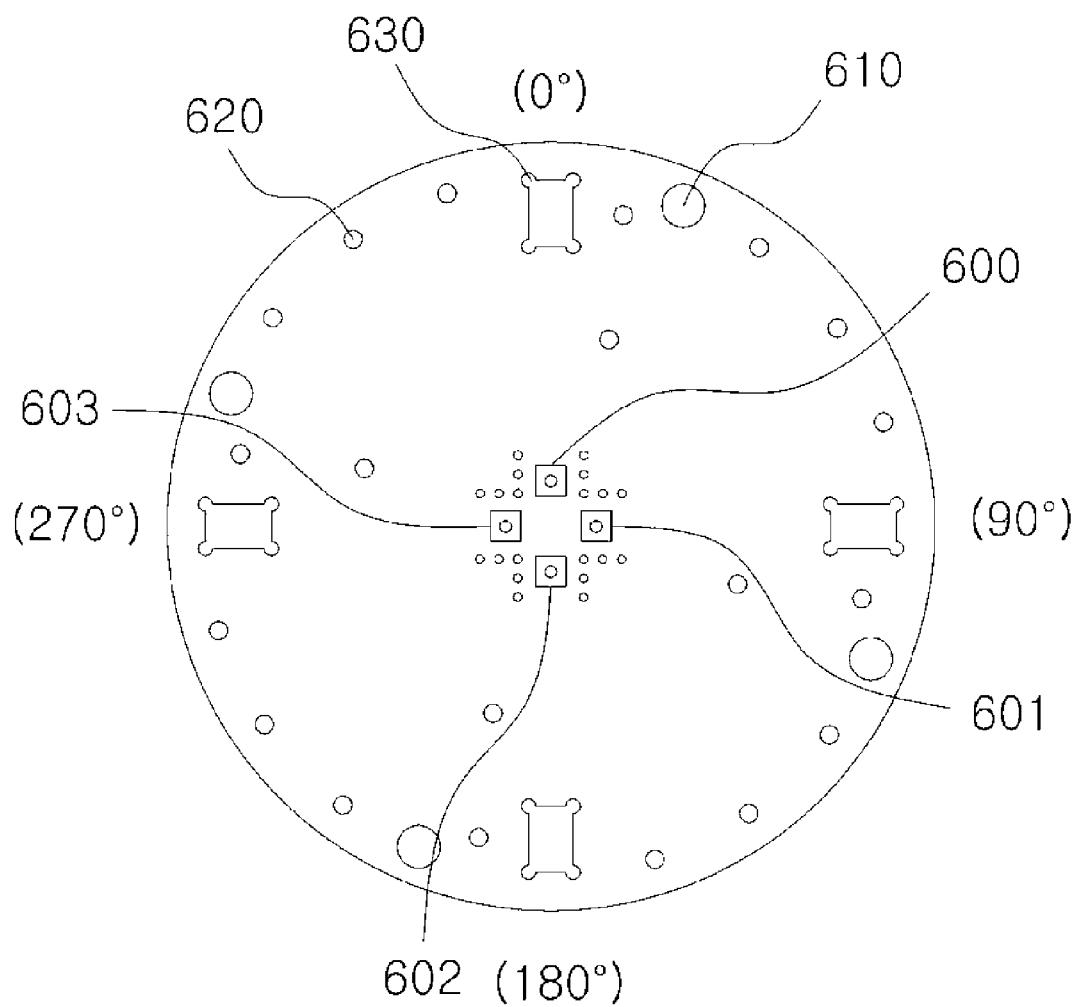
FIG. 6 is a diagram showing a rear surface of a transmission circuit pattern substrate 120a shown in FIG. 3.
Figure 7:
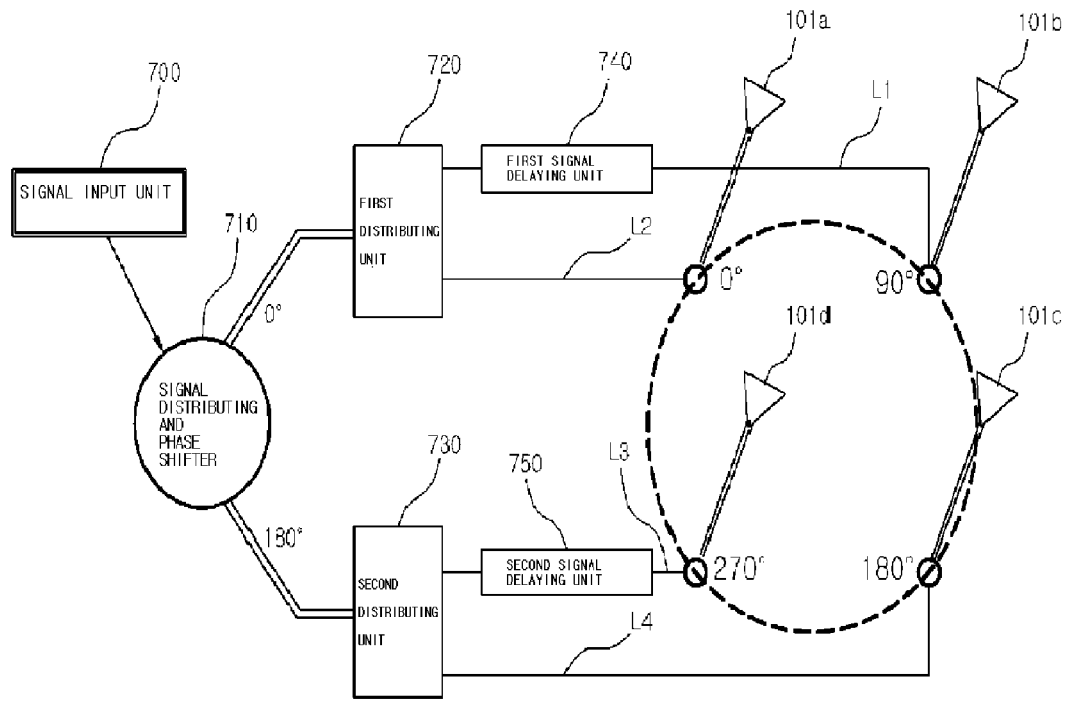
FIG. 7 is a block diagram of a feeding network of a transmission circuit pattern substrate 120b shown in FIG. 3.

The cross dipole antenna 110 and the quadrifilar helix antennas 101a, 101b, 101c, and 101d are welded onto the transmission circuit pattern substrate 120a. Further, in FIG. 6, a rear surface of the transmission circuit pattern substrate 120a is shown. Further, in FIG. 7, a block diagram of a feeding network of the transmission circuit pattern substrate 120a is shown. FIGS. 6 and 7 will be described below.

Referring back to FIG. 3, a transmission circuit pattern substrate enlarged cross-sectional view 120a-1 the showing a cross section of the transmission circuit pattern substrate 120a is shown in a lower part.

Referring to enlarged cross-sectional view 120a-1, the transmission circuit pattern substrate 120a is constituted by a first ground layer 120-1 made of a metallic material (a copper plate is generally used), a first dielectric layer 120-2, and a transmission circuit pattern layer 120-3 with the dielectric layer 120-2.

A transmission circuit cover substrate enlarged cross-sectional view 120b of a transmission circuit cover substrate 120b assembled to the transmission circuit pattern substrate 120a is shown in a lower part.

Referring to the transmission circuit cover substrate enlarged cross-sectional view 120b-1, the transmission circuit cover substrate 120b is constituted by a second dielectric layer 120-2 contacting the transmission circuit pattern layer 120-3 of the transmission circuit pattern substrate 120a and a second ground layer 120-1 for grounding.

Accordingly, the cross dipole antenna 110 and the quadrifilar helix antennas 101a, 101b, 101c, and 101d are welded on the first ground layer 120-1 of the transmission circuit pattern substrate 120a at regular intervals. A plumbum welding is used as the welding method.

Further, the cross dipole antenna 110 and the quadrifilar helix antennas 101a, 101b, 101c, and 101d are each assembled to form an angle of 90°. A diagram showing it is shown in FIG. 4. FIG. 4 will be described below.

The transmission circuit cover substrate 120b is assembled to the feeder bracket 130. The feeder bracket 130 is assembled to a parabola dish (not shown). For this, a hole (not shown) for fastening with the parabola dish may be formed at a corner of the feeder bracket 130. The feeder bracket 130 is generally made of an aluminum material, but is not limited thereto.

A reception circuit cover substrate 140b contacting the other surface of the feeder bracket 130 is assembled onto the bottom of the feeder bracket 130. A reception circuit cover substrate enlarged cross-sectional view 140b-1 showing a cross section of the reception circuit cover substrate 140b is shown in a lower part. Referring to the enlarged cross-sectional view 140b-1, the reception circuit cover substrate 140b is constituted by a third ground layer 140-2 made of a metallic material (the copper plate is generally used) and a third dielectric layer 140-1 coated on the third ground layer 140-2'.

A reception circuit pattern substrate enlarged cross-sectional view 140a-1 for a reception circuit pattern substrate 140a assembled to the reception circuit cover substrate is shown in a lower part. Referring to the transmission circuit cover substrate enlarged cross-sectional view 140a-1, the reception circuit pattern substrate 140a is constituted by a fourth ground layer 140-1 made of a metallic material (a copper plate is generally used), a fourth dielectric layer 140-2, and a reception circuit pattern layer 140-3 with the dielectric layer 140-2.

Of course, the transmission circuit pattern layer 120-3 and the reception circuit pattern layer 140-3 are different from each other in circuit wiring, but commonly have four phase shift circuit patterns (not shown) for phase shift. For understanding, a rear surface and a front surface of the transmission circuit pattern substrate 120a are shown in FIGS. 6 and 7. FIGS. 6 and 7 will be described below.

Referring back to FIG. 3, a pressing bracket 150 for press-fixing the reception circuit pattern substrate 140a and the reception circuit cover substrate 140b to the feeder bracket is assembled. Of course, round-head screws 121a to 121d and nuts 150a to 150d are used to fixe and fasten the transmission circuit pattern substrate 120a, the transmission circuit cover substrate 120b, the feeder bracket 130, the reception circuit cover substrate 140b, the reception circuit pattern substrate 140a, and the pressing bracket 150. However, it is just for understanding and the present invention is not limited to a screw-nut structure scheme and a connector scheme, and the like may be used.

Fasteners 131a to 131d for connecting the transmission circuit pattern substrate 120a and the reception circuit pattern substrate 140a with the feeder bracket 130 interposed therebetween and ends of the fasteners 131a to 131d are assembled to the transmission circuit pattern substrate 120a and the reception circuit pattern substrate 140a, respectively. As the fasteners 131a to 131d, a semi-rigid cable having low signal and/or power loss is used.

FIG. 4 is an external perspective view of a micro antenna feeder 10 for a wide band according to a preferred embodiment of the present invention.

Referring to FIG. 4, the transmission circuit pattern substrate 120a is laid on the feeder bracket 130 and the plate (111a of FIG. 3) of the cross dipole antenna 110 is connected onto the transmission circuit pattern substrate 120a at regular intervals of 90°. Of course, more specifically, transmission circuit pattern (111 of FIG. 3) etched and patterned on the plate (111a of FIG. 3) is welded to the transmission circuit pattern substrate 120a.

Further, helix receiving antennas 101a to 101d are arranged on the transmissions circuit pattern substrate 120a at intervals of 90 and welded to the fasteners 131a to 131d. Welding points 200a and 200b are shown in FIG. 4. Of course, the helix receiving antennas 101a to 101d are fixed and supported by the first helix antenna support 100a and the second helix antenna support 100b.

Further, a power feeder (not shown) supplying power to the helix receiving antennas 101a to 101d is installed on the transmission circuit pattern 120a. Accordingly, the power feeder (not shown) shares the transmission circuit substrates 120a and 120b and the reception circuit substrates 140a and 140b.

FIG. 6 is a diagram showing a rear surface of the transmission circuit pattern substrate 120a shown in FIG. 3. Referring to FIG. 6, a support groove 530 for fixing the helix antenna supports 100a and 100b of FIG. 3 as the copper plate, a screw groove 610 for fastening the round-head screws 121a to 121d of FIG. 3, and a via hol3 620 for connecting grounds of the transmission circuit pattern substrate 120a and the transmission circuit cover substrate 120b to each other. Further, phase shift circuit pattern grooves 600 to 603 for connecting a phase shift circuit pattern (not shown) and the cross dipole antenna 110 are formed. The phase shift circuit pattern grooves 600 to 603 are formed at intervals 90° in order to implement the circularly polarized wave.

Further, the phase shift circuit pattern groove 600 to 603 are connected with the feeding network block diagram of the transmission circuit pattern substrate 120a and the feeding network block diagram is shown in FIG. 7.

Referring to FIG. 7, in the feeding network block diagram, an input unit 700 inputting a signal x, a signal distributing and phase shifting unit 710 distributing the signal x inputted into the signal inputting unit 700 to x/2 and shifting a phase to 0° and 180°, a first signal distributing unit 720 distributing a distributed and phase-shifted signal x/2 to x/4, a second signal distributing unit 750 distributing the signal x/2 distributed and phase-shifted from the signal distributing an phase-shifting unit 710 to x/4, a first signal delaying unit 740 delaying the signal distributed to x/4 to 90°, a second signal distributing unit 730 distributing the signal x/2 distributed and phase-shifted from the signal distributing and phase-shifting unit 710 to x/4, and a second signal delaying unit 750 delaying the signal distributed to x/4 to 90°.

With this, a second pattern length L2 connected between the first signal distributing unit 720 and the first quad scheme antenna 101a is comparatively smaller than a first pattern length L1 connected between the first signal delaying unit 740 and the second quad scheme antenna 101b by a length of λ/4. Of course, a fourth pattern length L4 connected between the second signal distributing unit 730 and the third quad scheme antenna 101c is comparatively larger than a third pattern length L3 connected between the second signal delaying unit 750 and the fourth quad scheme antenna 101d by a length of λ/4.

Herein, a pattern width formed in the signal distributing and phase shifting unit 710, the first signal distributing unit 720, the second signal distributing unit 730, the first signal delaying unit 740, and the second signal delaying unit 750 is in the range of 0.3 mm±0.1 mm.

By such a feeding network structure, in the quad scheme antennas 101a to 101d circularly polarized scheme transmission and reception formed at angles 0°, 90°, 180°, and 270° are available.

The polarization is defined by a property of an electromagnetic wave representing a temporal change of the direction of a state observed depending on a radio wave and a comparatively size. That is, in brief, the polarization means the direction of the radio wave. The type of the polarized wave is classified into a linearly polarized (LP) wave and a circularly polarized (CP) wave.

Herein, the micro antenna feeder 10 for a wide band according to the preferred embodiment of the present invention uses the circularly polarized wave. The circularly polarized wave represents a wave of which an electric field rotates on an oscillation plane and has a constant size and which is irradiated while forming a circular trace and is generally used in a satellite broadcasting scheme.

Further, the radio wave according to the preferred embodiment of the present invention is irradiated while forming a sine wave by the unit of 360°. The position of a waveform on a sine-wave curve is referred to as a phase. However, one cycle of the sine wave may be displayed as 360 (2p). A value of λ (wavelength) depending on a frequency may be obtained in accordance with the following equation and the length of the wavelength λ means the length of a sine wave of one cycle (360°) at the frequency.

$$\lambda = \frac{f}{c} \qquad \text{[Equation 1]}$$

where, c represents $3 \times 10^8$ m and f represents the frequency. 90° may be converted into λ/4 by using Equation 1.

In the preferred embodiment of the present invention, as shown in FIGS. 6 and 7, a phase difference of 90 is given to each of four points 600, 601, 602, and 603 of FIG. 6. That is, further, as shown in FIG. 6, four points of 0°, 90°, 180°, and 270° are provided.

For this, the signal distributing and phase shifting unit 710, the first signal distributing unit 720, the second signal distributing unit 730, the first signal delaying unit 740, and the second signal delaying unit 750 are patterned on the surface of the transmission circuit pattern substrate 120a of FIG. 3.

Of course, in the preferred embodiment of the present invention, the rear surface an the front surface of the transmission circuit pattern substrate 120a of FIG. 3 are shown in FIGS. 6 and 7, but the rear surface and the front surface of the reception circuit pattern substrate 140b of FIG. 3 are configured similarly as the transmission circuit pattern substrate 120a.

Accordingly, the transmission circuit substrates 120a and 120b of FIG. 3 perform right hand circular polarization (RHCP) and the reception circuit substrates 140a and 140b of FIG. 3 perform left hand circular polarization (LHCP). Further, since the circularly polarized wave is irradiated while rotating clockwise, the transmission circuit substrates 120a and 120b perform the RHCP and the reception circuit substrates 140a and 140b of FIG. 3 have a phase difference of 270 from the reception circuit substrates 120a and 120b of FIG. 3. Accordingly, since the circularly polarized wave is irradiated while rotating counterclockwise, the reception circuit substrates 140a and 140b of FIG. 3 perform the LHCP.

Figure 8:
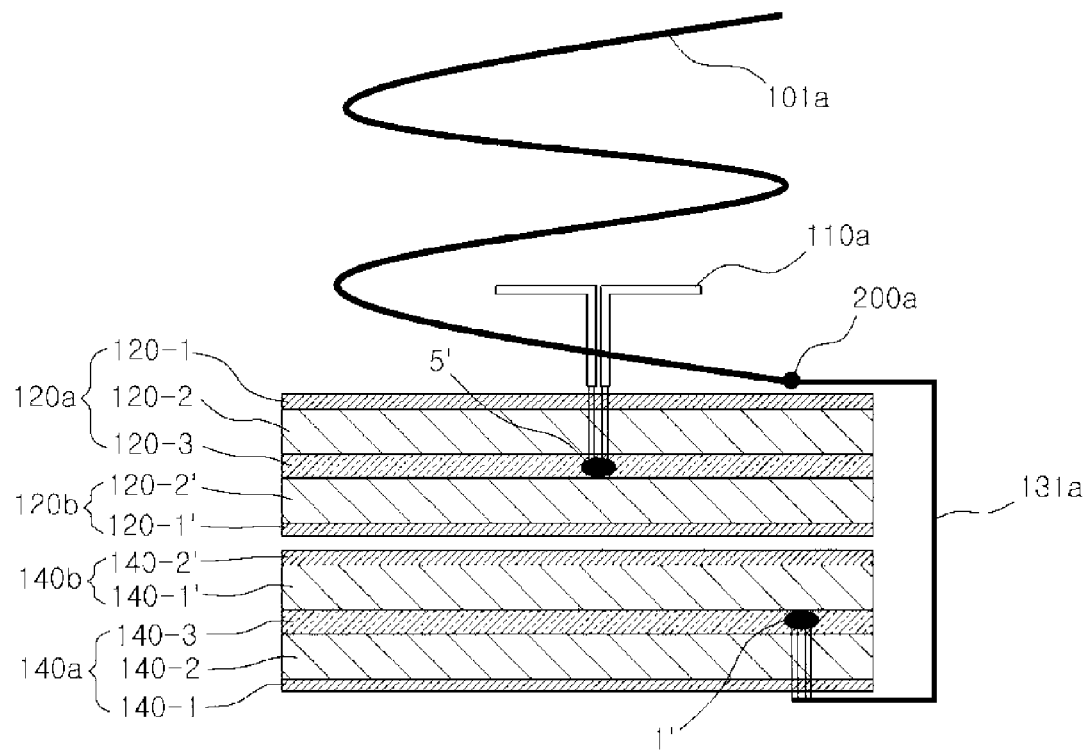
FIG. 8 shows a fastening structure of connecting the transmission circuit pattern substrate 120a and the reception circuit pattern substrate 140a by using a semi-rigid fastening structure 131a according to an preferred embodiment of the present invention.

FIG. 8 shows a fastening structure of connecting the transmission circuit pattern substrate 120a and the reception circuit pattern substrate 140a by using a semi-rigid fastening structure 131a according to a preferred embodiment of the present invention. Referring to FIG. 8, the first cross dipole antenna 110a is welded to the first cross dipole antenna feeding point 5 formed on the transmission circuit pattern 120-3 of the transmission circuit pattern substrate 120a and the first quad scheme antenna 101a is connected to the first quad scheme antenna feeding point formed on the reception circuit pattern layer 140-3 of the reception circuit pattern substrate 140. In this case, the first quad scheme antenna feeding point 1 and the first quad scheme antenna 101a are externally fastened by using a "D" shaped semi-rigid 131a. A diagram showing it is shown in FIG. 4. Accordingly, the first ground layer 120-1 of the transmission circuit pattern substrate 120a and the fourth ground layer 140-1 of the reception circuit pattern substrate 140a are bonded to each other and the first quad scheme antenna 101a is welded to an end of the semi-rigid 131a on one surface of the first ground layer 120-1.

Figure 9:
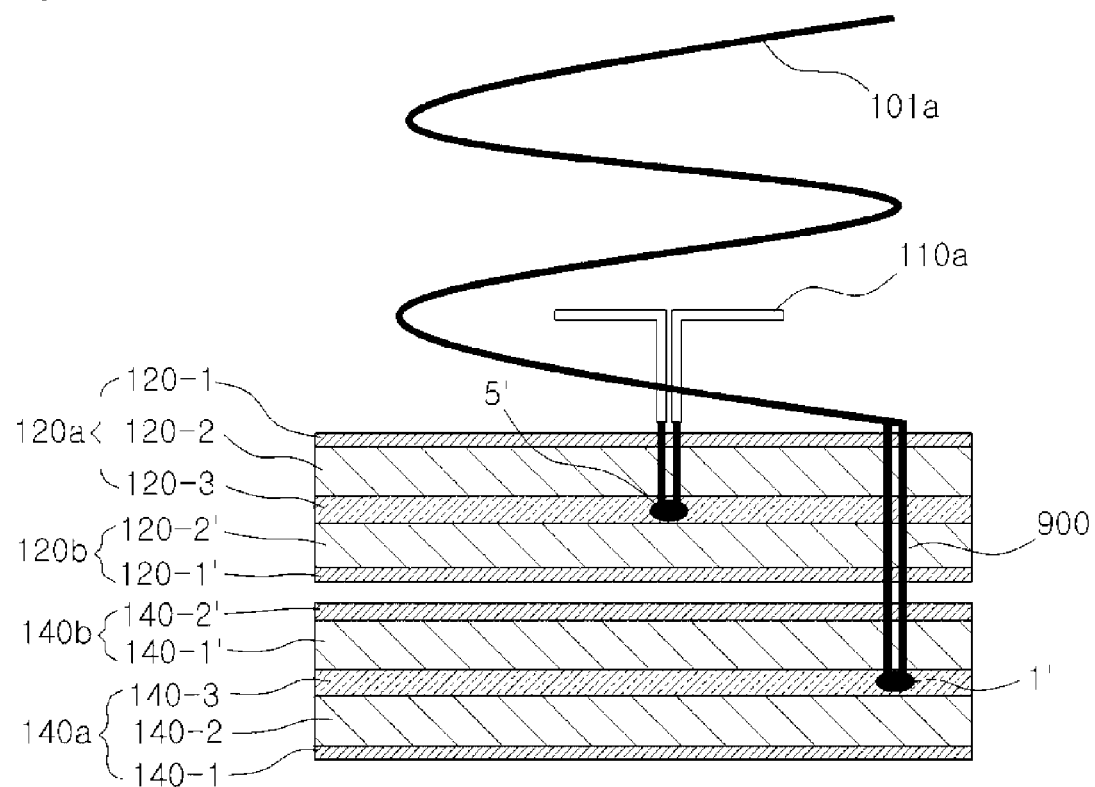
FIG. 9 shows a fastening structure of directly connecting the transmission circuit pattern substrate 120a and the reception circuit pattern substrate 140a by using a via hole 900 according to another preferred embodiment of the present invention.

FIG. 9 shows a fastening structure of directly connecting the transmission circuit pattern substrate 120a and the reception circuit pattern substrate 140a by using a via hole 900 according to another preferred embodiment of the present invention. Referring to FIG. 9, the transmission circuit pattern substrate 120a and the reception circuit pattern layer 140-3 of the reception circuit pattern substrate 140a are connected to each other through the via hole 900. Accordingly, the first quad scheme antenna 101a can be welded to the end of the semi-rigid 131a on one surface of the first ground layer 120-1. Of course, in accordance with the scheme shown in FIG. 9, performance may be deteriorated due to mutual interference in transmission and reception as compared with the connection method using the semi-rigid 131a described in FIG. 8.

Figure 10:
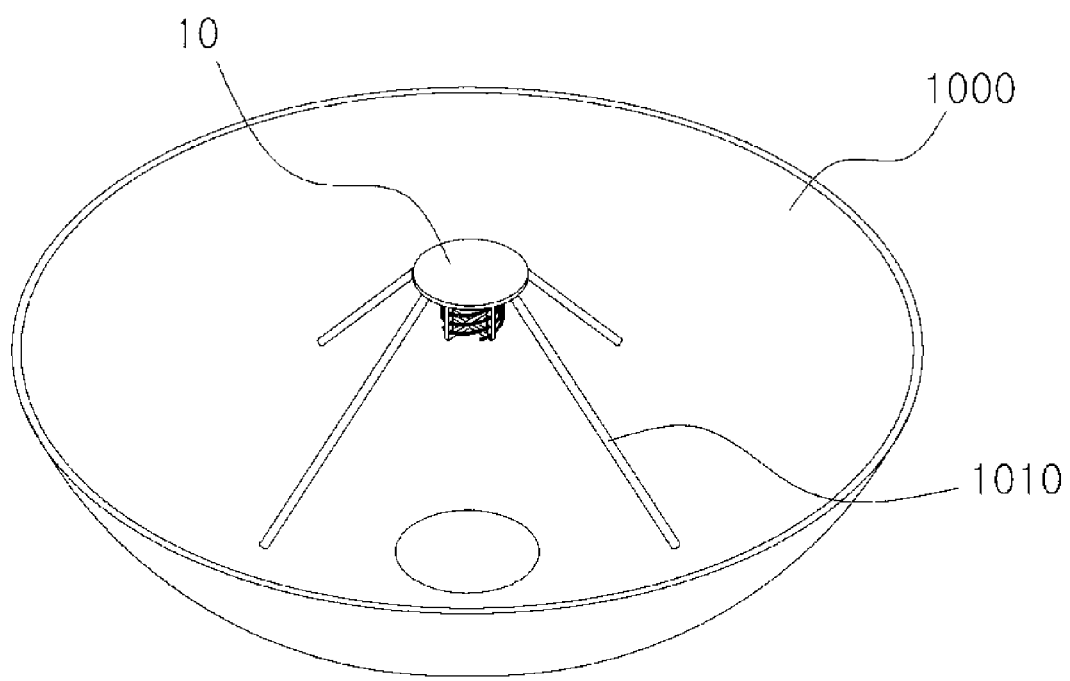
FIG. 10 shows an example in which the micro antenna feeder 10 for a wide band according to the preferred embodiment of the present invention is applied to a parabola dish 1000.

FIG. 10 shows an example in which the micro antenna feeder 10 for a wide band according to the preferred embodiment of the present invention is applied to a parabola dish. Referring to FIG. 10, the micro antenna feeder 10 is installed on the parabola dish 1000. Of course, for this, four supports 1010 are provided on the parabola dish 1000 and the supports 1010 are fastened to the feeder bracket 130 of FIG. 3 of the micro wideband antenna feeder 10.

In the preferred embodiment of the present invention, the reception circuit substrates 120a and 120b of FIG. 3 are coupled to the quadrifilar helix antennas 101a, 101b, 101c, and 101d of FIG. 3 for reception and the transmission circuit substrates 140a and 140b of FIG. 3 are coupled to the cross dipole antenna 110 for transmission. However, the present invention is not limited thereto and the transmission circuit substrates 140a and 140b of FIG. 3 are coupled to the quadrifilar helix antennas 101a, 101b, 101c, and 101d of FIG. 3 for transmission and the reception circuit substrates 120a and 120b of FIG. 3 are coupled to the cross dipole antenna 110 for reception.

Further, in the preferred embodiment of the present invention, only the structure of the quadrifilar helix antenna is shown and described, but is not limited thereto and the present invention can be applied to even a quadruple inverted F antenna, a quadrifilar spiral antenna, and the like.

The invention claimed is:

1. A micro wideband antenna feeder, comprising:
  a quad scheme antenna irradiating a first current distribution, the quad scheme antenna being any one of a quadrifilar helix antenna, a quadruple inverted F antenna, and a quadrifilar spiral antenna; and
  a cross dipole antenna installed in a cross shape in the quad scheme antenna, the cross dipole antenna irradiating a second current distribution orthogonal to the first current distribution,
  a transmission circuit substrate coupled to the quad scheme antenna or the cross dipole antenna; and
  a reception circuit substrate coupled to the quad scheme antenna or the cross dipole antenna,
  wherein the quad scheme antenna or the cross dipole antenna shares same transmission/reception focus and space as an assembled parabola dish, and
  wherein a frequency generated from the cross dipole antenna installed in the cross shape in the quad scheme antenna has a frequency band higher than a frequency generated externally from the quad scheme antenna, and both transmission and reception bands meet wideband circularly polarized characteristics.

2. The micro wideband antenna feeder of claim 1, wherein the transmission circuit substrate includes a transmission circuit pattern substrate and a transmission circuit cover substrate and the reception circuit substrate includes a reception circuit pattern substrate and a reception circuit cover substrate,
  wherein the transmission circuit pattern substrate and the reception circuit pattern substrate include:
  a signal inputting unit;
  a signal distributing and phase shifting unit distributing a signal generated from the signal inputting unit and shifting a phase of the signal to form a distributed and phase-shifted signal;
  a first signal distributing unit distributing the distributed and phase-shifted signal to a plurality of predetermined first angles;
  a second signal distributing unit distributing the distributed and phase-shifted signal to a plurality of predetermined second angles;
  a first signal delaying unit delaying the distributed and phase-shifted signal in order to change any one of the plurality of first angles to a third predetermined angle; and a second signal delaying unit delaying the distributed and phase-shifted signal in order to change any one of the plurality of second angles to a fourth predetermined angle.

3. The micro wideband antenna feeder of claim 2, wherein pattern widths of the signal distributing and phase shifting unit, the first signal distributing unit, the second signal distributing unit, the first signal delaying unit, and the second signal delaying unit are in a range of 0.2 to 0.4 mm.

4. The micro wideband antenna feeder of claim 3, wherein a pattern length of connecting the first signal distributing unit or the second signal distributing unit and one antenna unit of the quad scheme antenna is different from a pattern length of connecting the first signal delaying unit or the second signal delaying unit and another antenna unit of the quad scheme antenna by $\lambda/4$ in length.

5. A micro wideband antenna feeder, comprising:
- a quad scheme antenna irradiating a first current distribution, the quad scheme antenna being any one of a quadrifilar helix antenna, a quadruple inverted F antenna, and a quadrifilar spiral antenna;
- a cross dipole antenna installed in a cross shape in the quad scheme antenna, the cross dipole antenna irradiating a second current distribution orthogonal to the first current distribution;
- a transmission circuit substrate coupled to the quad scheme antenna or the cross dipole antenna;
- a reception circuit substrate disposed apart from the transmission circuit substrate at a predetermined distance and coupled to the quad scheme antenna or the cross dipole antenna; and
- a fastening unit connecting the reception circuit substrate and the transmission circuit substrate,
- wherein the transmission circuit substrate includes a transmission circuit pattern substrate and a transmission circuit cover substrate and the reception circuit substrate includes a reception circuit pattern substrate and a reception circuit cover substrate, and
- wherein the fastening unit connects the transmission circuit pattern substrate and the reception circuit pattern substrate through a semi-rigid cable externally or through a via hole internally,
- wherein the quad scheme antenna or the cross dipole antenna shares same transmission/reception focus and space as an assembled parabola dish, and
- wherein a frequency generated from the cross dipole antenna installed in the cross shape in the quad scheme antenna has a frequency band higher than a frequency generated externally from the quad scheme antenna, and both transmission and reception bands meet wideband circularly polarized characteristics.

* * * * *